United States Patent [19]

Selfridge et al.

[11] Patent Number: 5,999,192
[45] Date of Patent: *Dec. 7, 1999

[54] INTERACTIVE DATA EXPLORATION APPARATUS AND METHODS

[75] Inventors: Peter Gilman Selfridge, Watchung; Divesh Srivastava, New Providence, both of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/640,411

[22] Filed: Apr. 30, 1996

[51] Int. Cl.⁶ .................................................. G06F 15/00
[52] U.S. Cl. ............................................................. 345/440
[58] Field of Search .................................... 395/140, 141, 395/142, 143; 345/440, 441, 433, 333, 334, 335

[56] References Cited

U.S. PATENT DOCUMENTS 5,475,851  12/1995  Kodosky et al. .................... 395/800
5,611,059   3/1997  Benton et al. ...................... 395/326
5,627,979   5/1997  Chang et al. ....................... 395/335

*Primary Examiner*—Phu K. Nguyen

[57] ABSTRACT

A data exploration tool which has a graphical user interface that employs directed graphs to provide histories of the data exploration operations. Nodes in the directed graphs represent operations on data; the edges represent relationships between the operations. One type of the directed graphs is the derivation graph, in which the root of the graph is a node representing a data set and an edge leading from a first node to a second node indicates that the operation represented by the second node is performed on the result of the operation represented by the first node. Operations include query, segmentation, aggregation, and data view operations. A user may edit the derivation graph and may select a node for execution. When that is done, all of the operations represented by the nodes between the root node and the selected node are performed as indicated in the graph. The operations are performed using techniques of lazy evaluation and encachement of results with the nodes. Another type of the directed graphs is the subsumption graph, in which an edge leading from a first node to a second node indicates that the second node stands in a subsumption relationship to the first node. If a result of the operation represented by the first node has been computed, the result is available to calculate the result of the operation represented by the second node.

32 Claims, 11 Drawing Sheets

FIG. 2

| # | Diagram | Name | Description | Input |
|---|---------|------|-------------|-------|
| | | 203 | 205 | 207 | 209 |
| 1 | 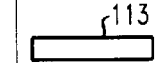 113 | Database node | Initial complete universal database (or a single table as the result of a join) | Database or table named required |
| 2 | 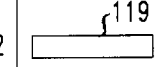 119 | Query node | Indicates a Query: a set of attributes and restrictions | Node types 1, 2, or 3, and single attributes and a restriction |
| 3 | 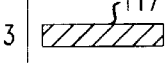 117 | Segmentation node | Indicates a segmentation, that is, a set of sets formed by segmenting a set by a single attribute | Node types 1 or 2 and a segmentation condition, i.e. a single attribute and a set of "tab stops" (could be the default natural segmentation if it's a set attribute) |
| 4 | 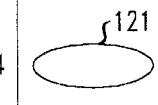 121 | Simple aggregation node | Typically, the "Count" aggregation operator. Produces a vector if input is a segmentation (type 3) | Node type 1, 2 or 3 and which operator (e.g. count) |
| 5 |  211 | Aggregation node | Like "Average" over another attribute. Produces a vector if input is a segmentation (type 3) | Node type 1, 2, or 3 and the operator and another single attribute (i.e. what to average over) |
| 6 |  123 | Histogram Viewer | Produces a histogram | Node type 4 or 5 |
| 7 |  213 | Text node | Has an associated text template; fills in using path | 4 or 5 |
| 8 |  215 | Report node | Creates a birds eye view of a "report" from graph and text | 6, 7 |

201

INTERACTIVE DATA EXPLORATION APPARATUS AND METHODS

BACKGROUND OF THE INVENTION

1. Field of the Invention

The invention concerns graphical user interfaces generally and more particularly concerns graphical user interfaces for data exploration systems.

2. Description of the Prior Art

The computer has permitted organizations to acquire, store, and access vast amounts of data about their operations, their suppliers, their customers, and their employees. The existence of this data has in turn lead to the development of techniques for exploring and analyzing the data and the emergence of a new information specialist: the business data analyst or BDA.

The business data analyst is not without tools. There are dozens of commercial data exploration and analysis tools available available under the overlapping categories of "decision support systems", "executive information systems", analysis environments, and OLAP (on-line analytic processing) tools. See for example the survey of these tools in "A data miner's tools", *Byte Magazine*, 2(10):91, October 1995. Other tools include ad-hoc query tools and report writers. New commercial tools continue to appear almost weekly.

The academic database research community has also addressed data exploration and analysis. They have done so first with research in difficult technical areas including query optimization, database structure, and advancing the underlying relational data model to handle new types of data. One product of their research has been improved algorithms for dealing with the problems raised in these areas. Additionally, "knowledge discovery in databases" has become an active research area. Knowledge discovery is similar to data mining, but is primarily concerned with using machine learning and statistical approaches to deriving new knowledge from preexisting large corporate and scientific databases.

In spite of all of this activity, the business data analyst still does not have a set of tools that is really well suited to what he or she does. The academic tools, with their emphasis on machine learning, do not take into account the central role of the human data analyst in discovering useful patterns in the information, while the commercial tools are useful for finding information once the analyst knows what he or she is looking for, but do not help the analyst to figure out what part of the data is relevant to the task at hand. Moreover, existing tools cannot be easily combined to form an easy-to-use environment for data exploration and analysis. The following example shows the problems faced by a business analyst who employs the tools presently available:

AT&T Corp markets a variety of telecommunications services. The marketing activities include promotions, on-going advertisement, new service offerings, new equipment offerings, bundled offerings, etc. Of course, AT&T's competitors are engaged in the same kinds of activities. AT&T is vitally interested in understanding the general market reaction to these efforts; doing so is surprisingly difficult. While AT&T has many large databases containing billing and customer premise equipment information, it is still difficult to find the right data and interpret it in the right context to glean the appropriate business insight. It is the task of the business data analyst to use this data to answer various business questions.

The task is made more difficult at AT&T the sheer volume of the data. A data file, which combines data from many sources, might have 15 million records and take up ½ a gigabyte of storage. AT&T has many hundreds of such data files. For this reason, the data is not read into a relational data base. Instead, AT&T keeps most of the data files on 8 mm tape until they are needed, at which point they are read into flat files of the type used in the UNIX operating system for processing (UNIX is a trade mark of the X Open Foundation).

The tools presently used in AT&T to explore and analyze this data are the following:

a small set of utilities provided with the UNIX operating system, including "grep", "sort", "unique";

programs written in programming languages like C or AWK;

statistical packages like S; and tree induction routines.

These tools are used under the X window system. The main reason these tools are used instead of a data base system is the quantity of data to be analyzed. With really large amounts of data, it is typically much faster to do analysis on a flat file than to use a data base system. That is particularly the case if the calculations involved in the analysis are well-understood and can be done on one pass through the data. The price paid for this speed is a lack of the "meta-data" support which is typically provided by a data base system: a flat file has no inherent structure, no information on the semantics or types of the data in the fields, and no integrity checking.

A typical one to two hour exploration and analysis session at AT&T involves operations like the following:

Run custom AWK script to divide base file by credit history into 4 segment files.

Pick smallest segment file for initial exploration.

Visually scan data to get a feeling for number of nulls in the revenue field.

If it seems high, run a small script to actually count them. If still high, note down.

Decide to examine revenue by region—run a small script to translate data file into files that S can read.

Drop into S to do the graphing, potentially customize the graph using the S language.

Note that one region has an "interesting" value (perhaps much higher than expected).

Extract the records with that region (by running a small script) into a new file.

Examine some other attribute of that file, using S, and create a graph "really" worth saving.

Try to go back and "do the same thing" to all of the categories created, or some combinations of the categories (which, in this example, is credit history by region by revenue, with several other attributes).

As is apparent from the foregoing, the work involves the use of many different tools. This in turn necessitates (1) manual bookkeeping, and (2) data translation. What the data analyst needs, and what the current tools do not provide are support for flexible data segmentation, support for keeping track of a sequence of operations, support for reuse of work, and enforced semantics between operations and data (and thus between sequences of operations). The analyst further needs support for translation of data between file formats, support for capturing relationships between files, support for recovery from errors made earlier in a session, and support for window management. It is an object of the techniques described in the following to overcome these and other problems of the environments presently available for doing data exploration and analysis and thereby to provide an improved system for doing that work.

SUMMARY OF THE INVENTION

The problems are overcome by means of a graphical interface for specifying operations on data. The graphical interface lets the user specify the operations as a directed graph of one or more nodes and edges, with each node representing an operation on the data and with an edge indicating that the node the edge comes from is a source of data for the operation represented by the node to which the edge goes. The directed graph thus provides a derivation history of the operations on the data. To actually execute the operations in a branch of the graph, the user selects a node in the branch.

In a preferred embodiment, the directed graph is a tree whose root is a node representing a source of data. When the invention is used for an application such as data discovery and analysis, the operations specified by the nodes include queries of the source of data represented by the incoming edge, segmentations of the source of data, aggregation operations on the source of data, a viewer operation which displays the data of the source, and an external tool operation which provides the data of the source to an external tool. The graphical interface permits the user to edit the graph and in some embodiments, the graphical interface will indicate whether a node of a given class can be added at that point of the graph.

In another aspect of the invention, the graphical interface also provides directed graphs whose edges show subsumption connections between the nodes. There is a subsumption connection between two nodes if the data which results from the operation represented by the second node reveals more detail about the data which results from the operation represented by the first node. There are four kinds of subsumption connections which may be displayed in a preferred embodiment: query—query, segmentation—segmentation, query-segmentation, and segmentation-query. In a preferred embodiment, the graphical interface displays the directed graph for the subsumption connection as an overlay on the directed graph for the derivation history.

Important aspects of the preferred embodiment include the following:

use of a data base to store not only the data being investigated, but also persistent representations of the directed graphs;
  a client-server architecture in which the data base operations are performed in the server and the client displays the directed graphs, provides data base queries derived from the directed graphs to the server, and receives the tables resulting from those queries; and
  lazy evaluation of the operations specified in the directed graph, with evaluation being done only when the user specifies execution of a branch of the graph and with the results of operations being encached in the representation of the graph, so that a branch need be evaluated only from the point at which an encached result is available.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 2 is a table of the node types employed in the preferred embodiment;

Figure 1:
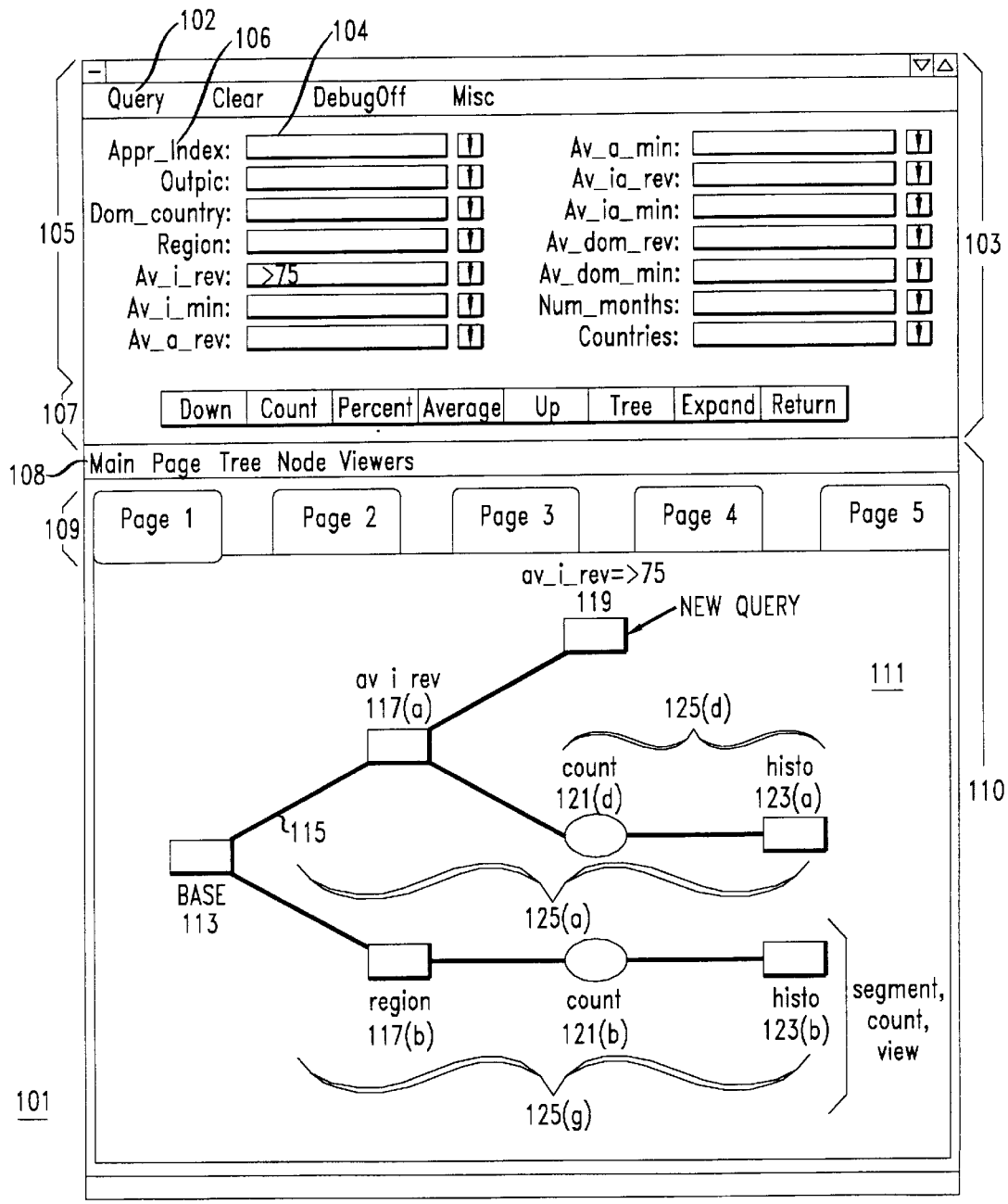
FIG. 1 shows a display window of the preferred embodiment.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first show how a data exploration and analysis system using the techniques disclosed herein appears to the business data analyst using the system, will then present the principles which guided the development of the system, and will finally describe the implementation of the preferred embodiment in detail.

The User Interface of a Preferred Embodiment: FIGS. 1–11

A business data analyst who uses the data exploration and analysis system disclosed herein interacts with the system by means of input devices such as a keyboard and a pointing device (for example, a mouse), and an output device such as a display screen. In the preferred embodiment, the displays on the display screen are produced by a windowing system, and the windowing system also handles inputs from the input devices.

A Typical Display Window: FIG. 1

FIG. 1 shows a typical display window 101 for the data exploration and analysis system. The window has two main sections: bottom section 110 contains a directed graph 111 of nodes connected by edges 115. Directed graph 111 represents a sequence of data analysis operation. Top section 103 is used to define nodes of graph 111.

Each node in directed graph 111 represents an operation; an edge 115 connecting a first node and a a second node indicates that the operation represented by the second node is done on the result of the operation represented by the first node. In a preferred embodiment, directed graph 111 has a base node 113 as its root. Base node 113 represents the data set to which the operations in the directed graph are to be applied.

The operations represented by the nodes include query operations, segmentation operations, aggregation operations, and viewer operations. A query operation in the present context specifies a set of data to be returned to the business data analyst. The set is generally a subset of a larger set, and the query specifies the subset by limiting the larger set. For example, the data may include people of every age, and the query may define a subset of the data by restricting the ages people in the subset may have to the range 21–30 years. A segmentation operation divides a set of data into non-overlapping groups according to values of an attribute of the data. For example, in our subset of people of ages 21–30 years, the people in the subset can further be segmented by values of the attribute "sex" to produce a group of males and a group of females. Aggregation operations provide summary information about the data set. Aggregations include counts of members of segments, sums of the values of an attribute, or an average of the values of an attribute. An example aggregation operation would be finding the average age of the people in the subset 21–30. Viewer operations display the results of any foregoing operations. One example of a viewer operation is making a histogram.

Applying all this to FIG. 1, in branch 125(b), the first edge 115 in the branch leads to a segmentation node 117(b). The node represents a segmentation operation to be performed on the data set of node 113, and the label indicates the attribute whose values determine the segmentation, in this case, the geographic regions. The next edge leads to an aggregation node 121(b) which performs an aggregation operation on the data in the segments produced by segmentation node 117(b). As indicated by the node's label, the aggregation operation is a count operation; it counts the number of people in each region. The next edge leads to the last node in the branch, namely a viewer node 123(b). In this case, the label indicates that viewer node 123(b) is a histogram node, so the counts produced by the count operation in node 121(b) are to be used to produce a histogram.

The other branch in directed graph 111 is branch 125(a), which has two subbranches, branch 125(c) and branch 125(d). Beginning at base node 113 and ending at the ends of each of the subbranches, branch 125(a) describes two distinct sequences of operations; in the case of subbranch 125(c), the operations first segment the data represented by base 113 by values of the attribute average international revenue (av_i_rev) (node 117(a)) and then query the segments with a query which limits the average international revenue to an amount greater than 75 (node 119). In the case of subbranch 125(d), the operations first segment as described above, then do a count (node 121(d)) on the segments, and thereupon make a histogram based on the count (node 123(a)). Expressed more generally, the path between the root of directed graph 111 and any node in directed graph 111 describes a sequence of operations to be performed on the data represented by the root node 113.

To actually perform a sequence of operations, the business data analyst employs the mouse to right-click on a node. The system responds to the right-click by performing the operations specified in the nodes between the selected node and the root node on the data set specified by the root node, beginning with the root node. As will be explained in more detail later, the system employs lazy evaluation, that is, a query is not evaluated until the whole sequence of operations is evaluated. The system further encaches the results of previous executions of sequences of operations, so that a new evaluation need be done only from the last node on the branch which has encached results. For example, if branch 121(d) of FIG. 1 has already been evaluated, then an evaluation of branch 125(c) will employ the results of the evaluation of node 117(a) which was done during the evaluation of branch 121(d).

The business data analyst builds graph 111 by defining nodes and adding them to the graph. In the preferred embodiment, there is a current node which is either the last node to be added or a node explicitly selected as the current node by the business data analyst. In FIG. 1, query node 119 is the current node. The current node is displayed in blue. Once the business data analyst has defined a new node, the new node is added to the graph as a child of the current node and itself becomes the new current node.

How a node is defined depends on the kind of node. Viewer nodes are defined by selecting Viewers from menu 108 and selecting the type of viewer node, for example a histogram node such as 103. The node is added as soon as the selection is made. Aggregation nodes are defined using the count, percent, and average buttons at 107. Menus which appear when the buttons are selected permit detailed definition of the aggregation operation.

The business data analyst employs portion 105 of window 101 to define query and segmentation nodes. Which type of node is being defined is determined by toggle button 102. In window 101, it is set to Query, and that is what is being defined. Portion 105 contains a list of the attributes 106 of the data in the data set being analyzed. For example, the attribute Av_i_rev is the average international revenue. Each attribute on the list has a dialog box 104 next to it in which a limitation on the value of the attribute may be specified. For example, the dialog box 104 for the Av_i_rev attribute contains >75, specifying that the query being defined will select data items for which the value of that attribute is greater than $75. With segmentation nodes, the segmentation is done on the basis of a single attribute, and the business data analyst puts the ranges for the segmentation in the dialog box 104 for the attribute 106 which is being used for the segmentation. The Up button in buttons 107 permits the business data analyst to use the restriction or segment boundaries of the current query or segmentation node to define a new query or segmentation node. The Expand button creates a query node corresponding to each group defined by a prior segmentation node. Once the business data analyst has defined the segmentation or query node, he or she adds it to the graph by pressing the Down button in button set 107.

Continuing with further details of window 101, there may be a number of pages of graphs accessible through the window. A given page is selected either by using the tabs shown at 109 or by selecting Page from menu 108 and specifying a page there. Selection of Node in menu 109 displays a menu of operations which may be performed on nodes; in a preferred embodiment, the operations include delete, copy, and move; selection of Tree in menu 109 displays a menu of operations which may be performed on subtrees of graph 111, again including the delete, copy, and move operations. The Return button, finally, of buttons 107 permits the business data analyst to select a different data set to apply graph 111 to. Typically, a business data analyst first defines graph 111 experimentally on a small data set and then applies graph 111 to a large data set whose data items have the same attributes as the data items of the small data set.

Classes of Nodes in Graph 111: FIG. 2

FIG. 2 is a table which shows the classes of nodes employed in graph 111 in a preferred embodiment. Each row of the table contains the information for one node class; the columns specify the diagram used for the node in graph 111 (203), the name of the node class (205), a description of the node class (207), and a description of the kinds of nodes whose output can serve as input for nodes of the type. For example, a query node 119 can receive its input from another query node 119, a segmentation node 117, or a data base node 113. In other embodiments of the system, the rules for the kind of input required for a node may be used to do consistency checks on the graph 111 as it is developed by the business data analyst. For example, the system would indicate an error if a query node 119 followed an aggregation node 121 or a histogram viewer node 123. New node types 213 and 215 represent operations involved in generating reports based on the results of a sequence of operations.

A Typical Session with the System: FIGS. 3–11

Figure 3:
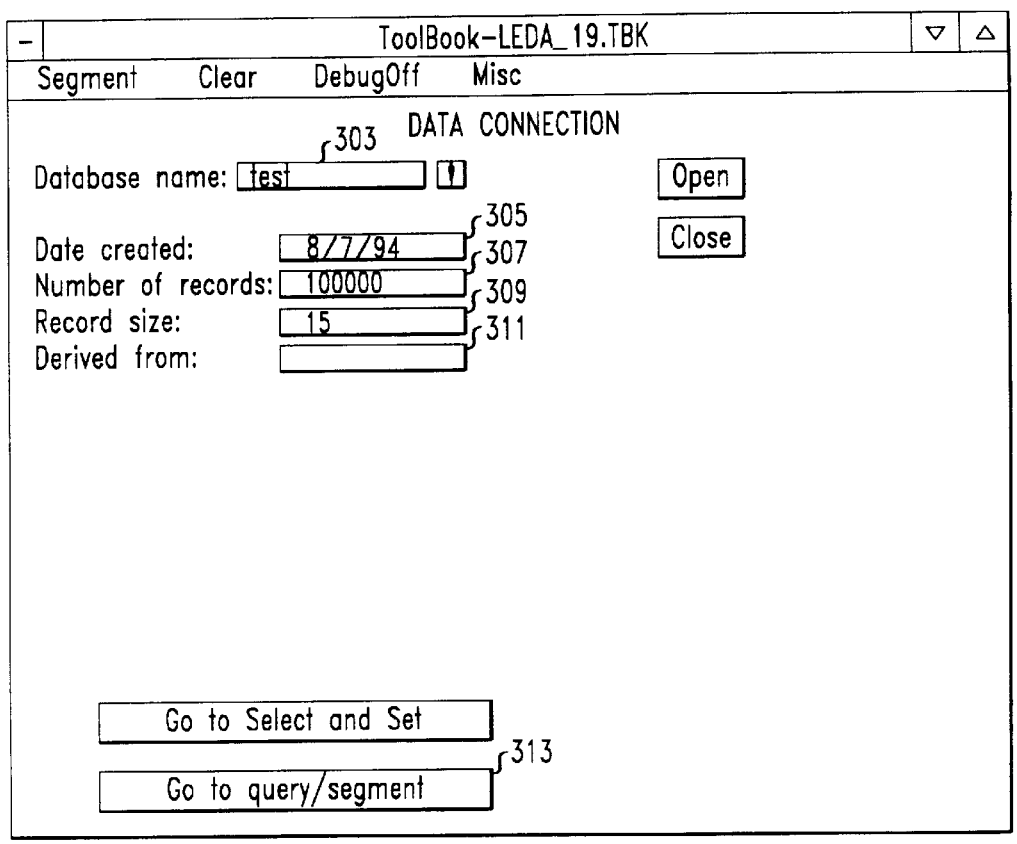
FIG. 3 is a first display window of a session in which the preferred embodiment is employed.

A typical session with the system begins as shown in FIG. 3 with data connection display 301, which the business data analyst uses to specify which data set he or she is going to examine. In display 301, dialog box 303 specifies the data base name; boxes 305–311 display information about the data base, including the name of whatever database (if any) it is derived from. As mentioned above, a business data analyst will typically experiment with a small data base and then apply the sequences of operations that appear fruitful on the small data base to a large data base. To begin the analysis, the business data analyst pushes button 313.

Figure 4:
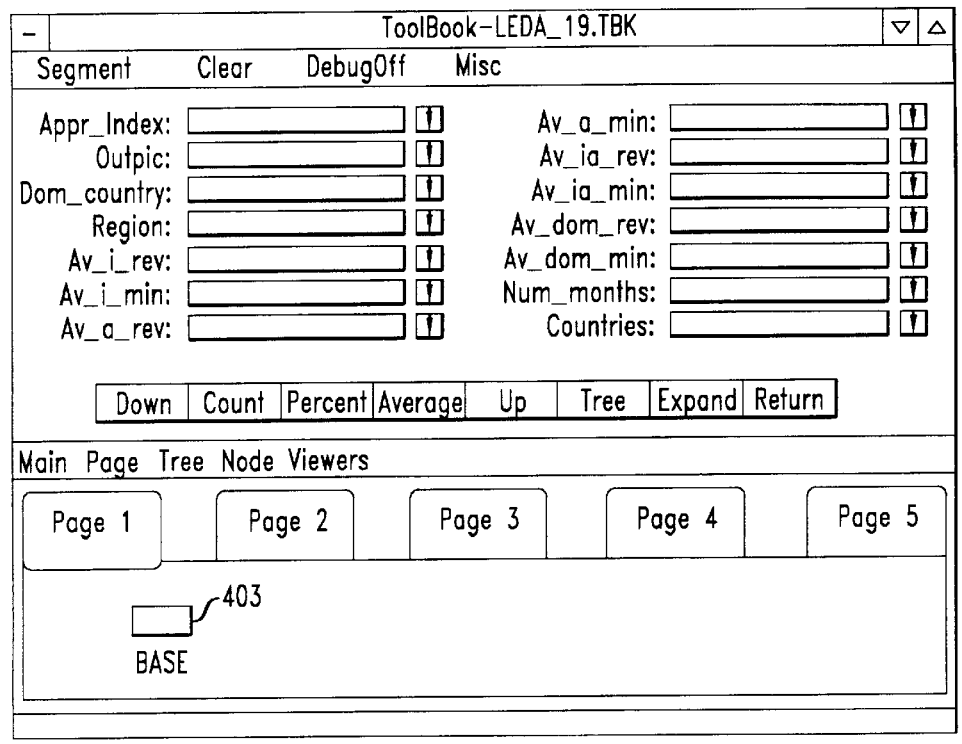
FIG. 4 is a second display window of the session.
Figure 5:
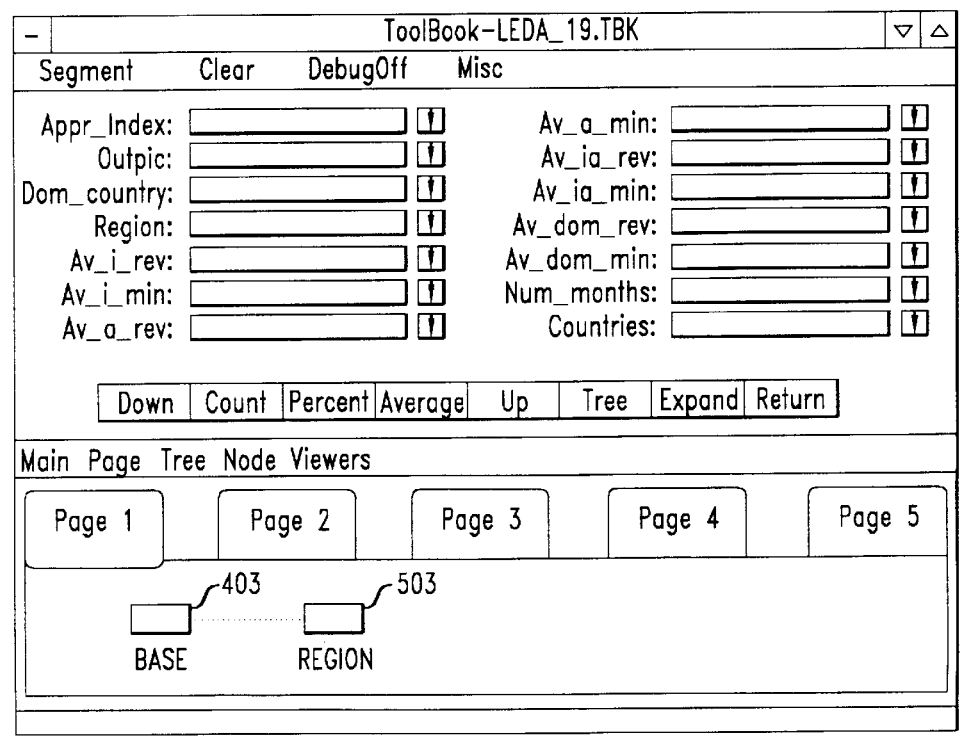
FIG. 5 is a third display window of the session.
Figure 6:
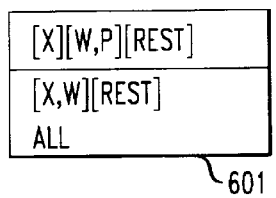
FIG. 6 is a menu usable in a display window of the session.

Thereupon, the display of FIG. 4 appears. In this display 401, the graph has a single node, namely base node 403 representing the data base selected in display 301. The data analyst next defines a segmentation node 503 for the tree, as shown in display 501 of FIG. 5. The segmentation node is segmented on the Region attribute, and as indicated by the ALL in dialog box 505, there is a segment for each region. FIG. 6 shows how in a preferred embodiment, dialog box 505 may be customized to provide a menu 601 for interesting set of segmentation choices. The same kind of customization may be done for any of the dialog boxes in portion 105 of display 101.

Figure 7:
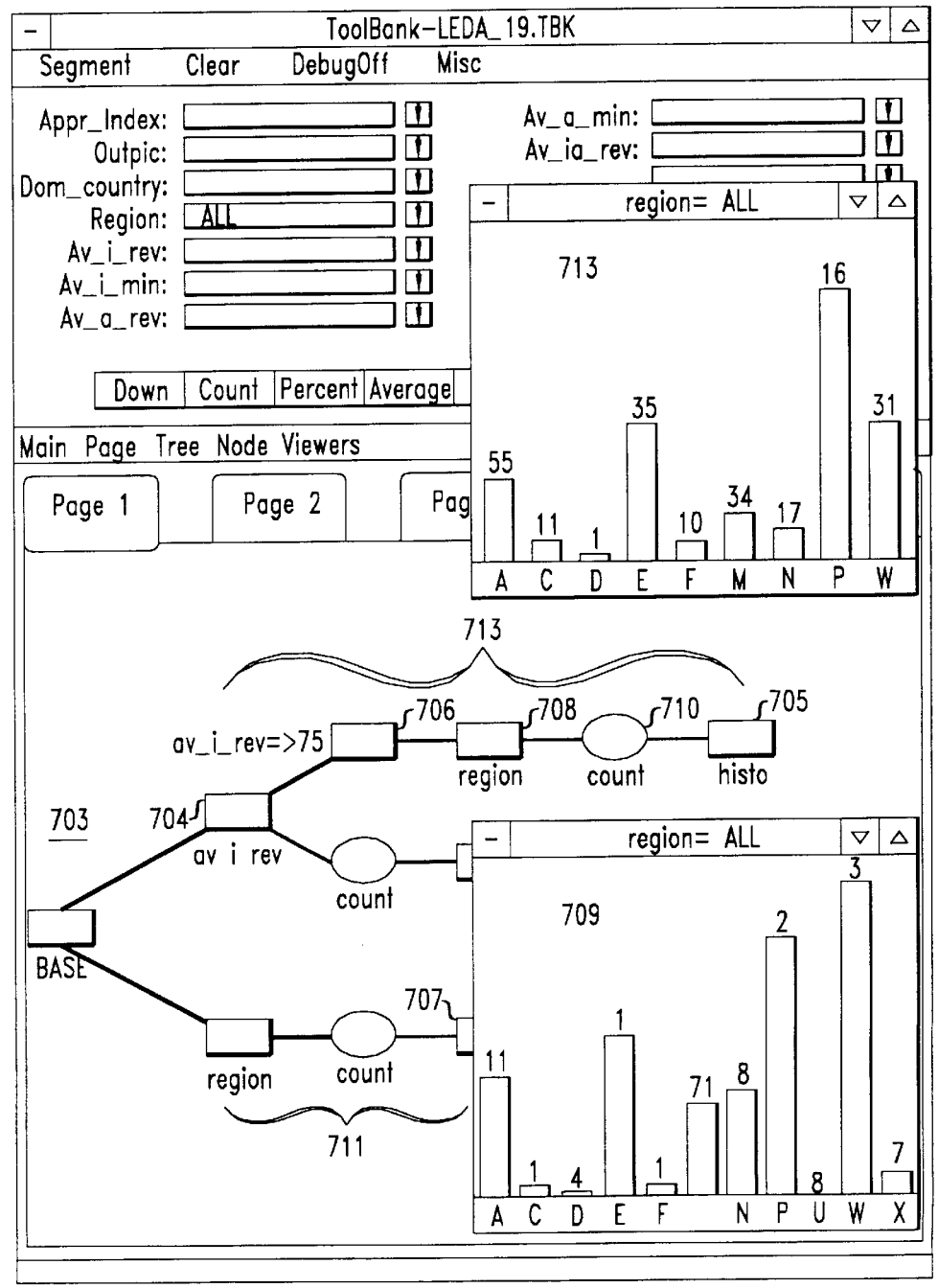
FIG. 7 is a fourth display window of the session.

FIG. 7 shows a later stage of the investigation. Graph 703 now has three branches, and the business data analyst has executed the branches ending in histogram nodes 705 and 707. The business data analyst began by constructing branch 711 and executing it, resulting in histogram 709, which shows that the population as a whole calls the western European region (the bar marked "W") most often and the Pacific region (the bar marked "P") next most often. On seeing this result, the analyst constructed branch 713, in which the segments produced by node 704 are restricted by query node 706 to customers whose international revenue is >75 and the result of the query is again segmented by region (node 708), a count made on the basis of the segmentation (node 710), and a histogram made from the count (node 705). The histogram appears at 713. When histogram 713 is compared with histogram 709, it can be seen that the high-end customers isolated by the query represented by node 706 call the Pacific region more frequently than they call the western European region.

Figure 8:
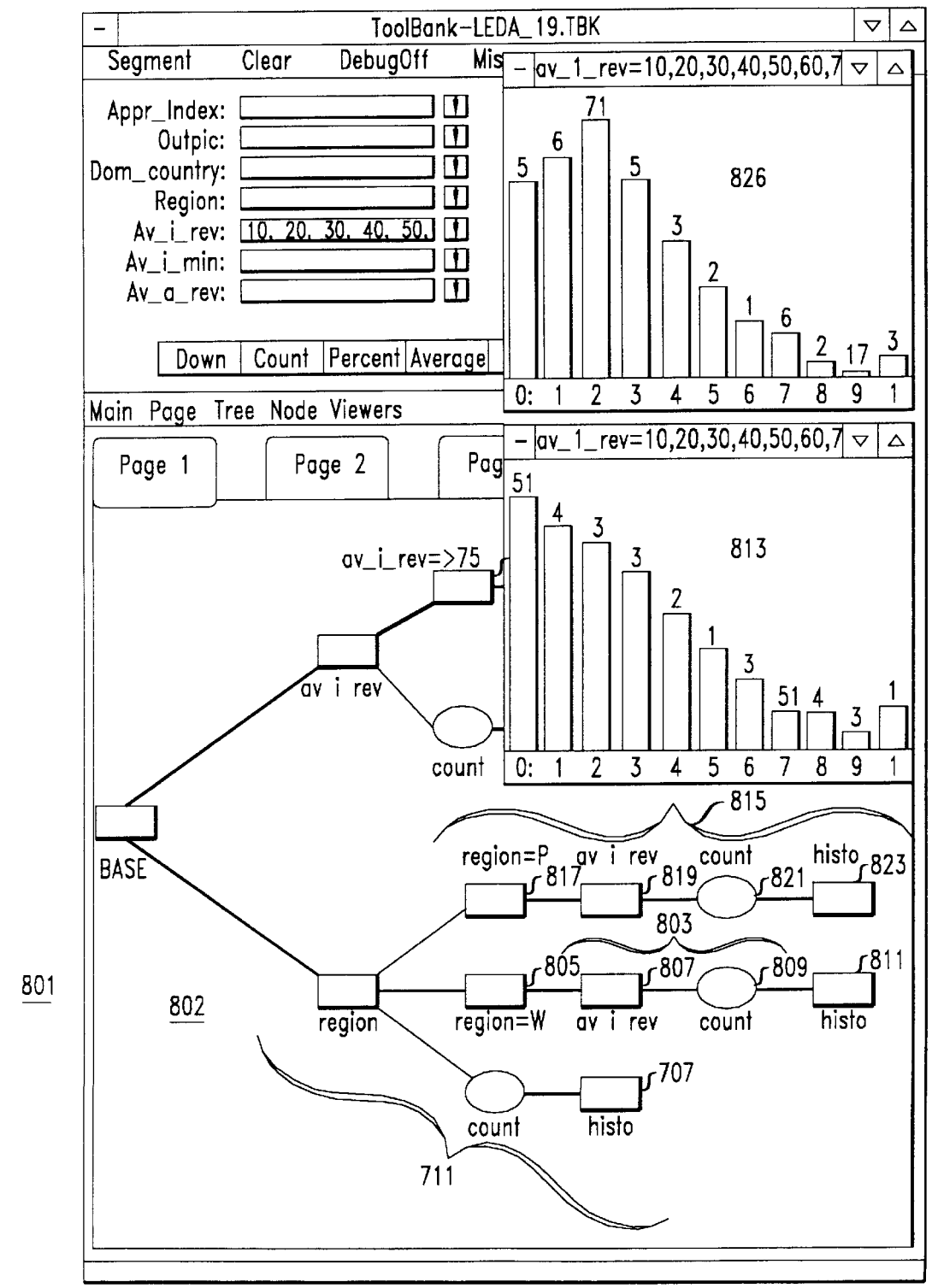
FIG. 8 is a fifth display window of the session.

That is an interesting fact, so the business data analyst continues as shown in FIG. 8. Two branches, 823 and 811 have been added to graph 703 to make graph 802. Branch 815 first makes a query (817) which separates out the data from the Pacific region and then segments it with a finer-grain segmentation on the attribute av_i_rev (819), does a count of the segmentation (821), and makes a histogram (823). The histogram is shown at 825. As shown by nodes 805–811, branch 803 is similar except that the query 805 separates out the data from the western European region to produce histogram 813. Again, there are interesting differences. For the western European region, call frequency is very strongly related to call length, with longer calls being generally less frequent; in the Pacific region, on the other hand, call frequency increases with length at the left-hand side of the histogram.

Figure 9:
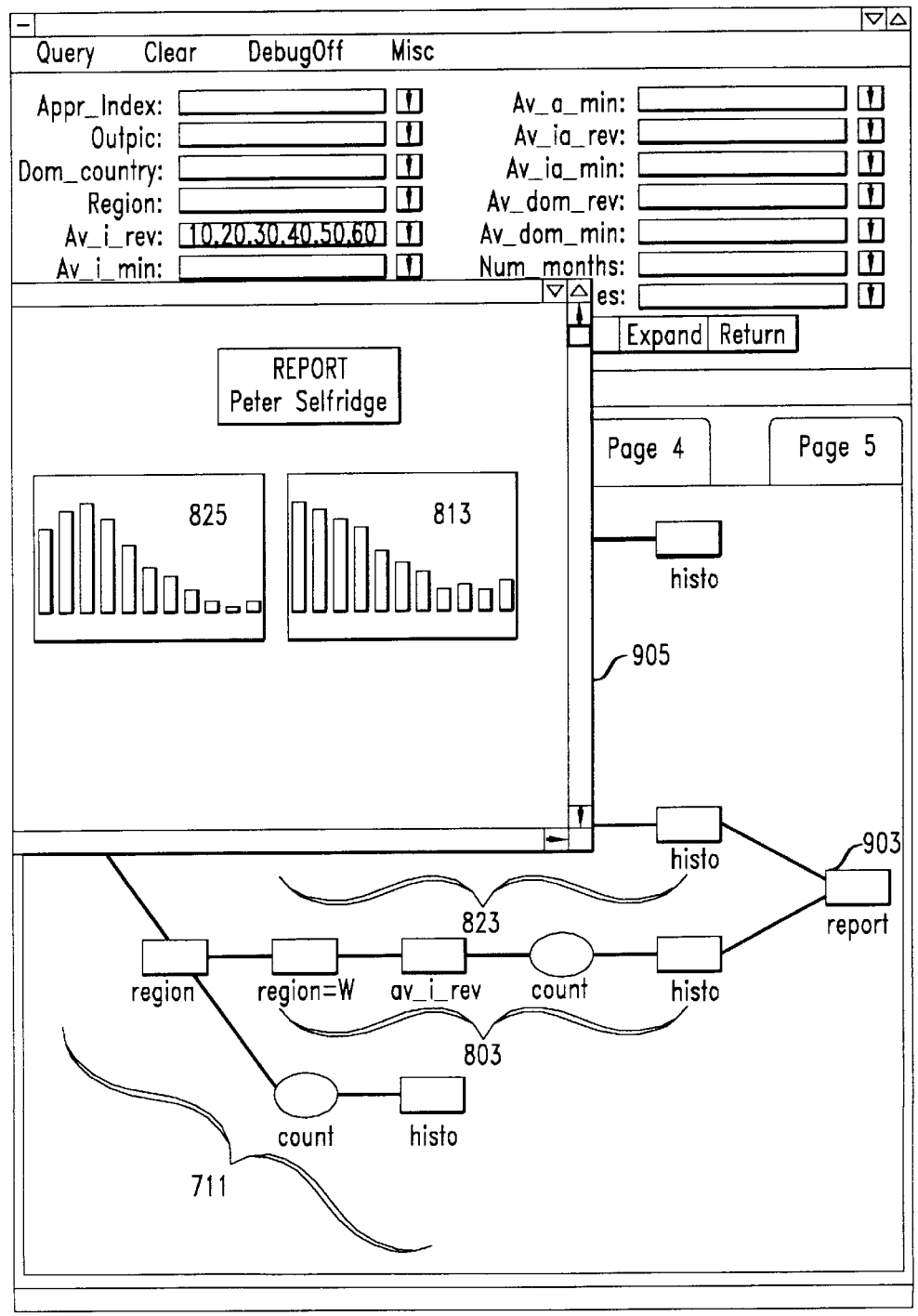
FIG. 9 is a sixth display window of the session.

The data analyst finds histograms 813 and 825 interesting enough to want to include them in a report. FIG. 9 shows how this is done. As shown in display 901, a viewer node of the report type (node 903) is added to take the outputs of branches 823 and 803; the report, with histograms 825 and 813 appears in window 905.

Figure 10:
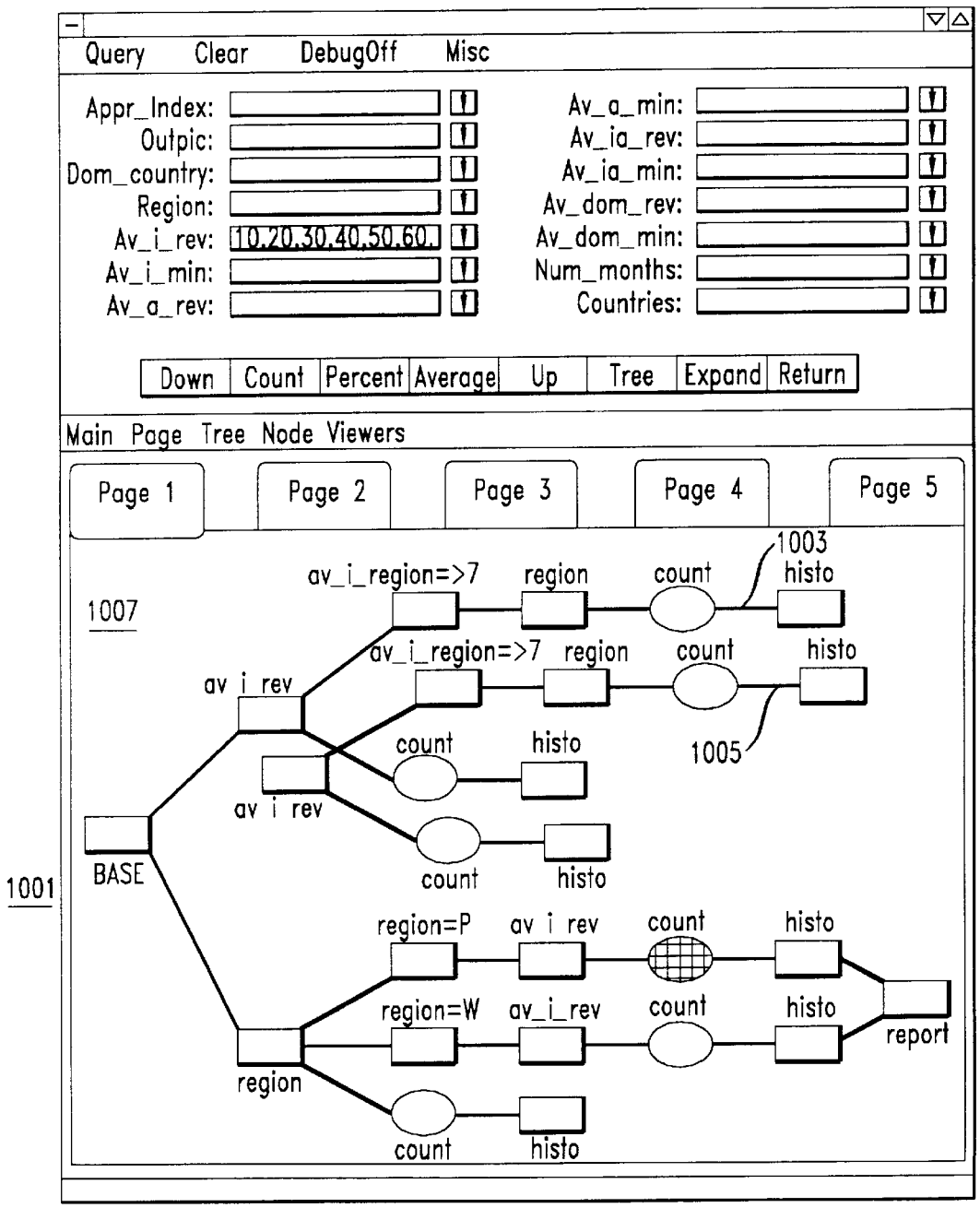
FIG. 10 is a seventh display window of the session.
Figure 11:
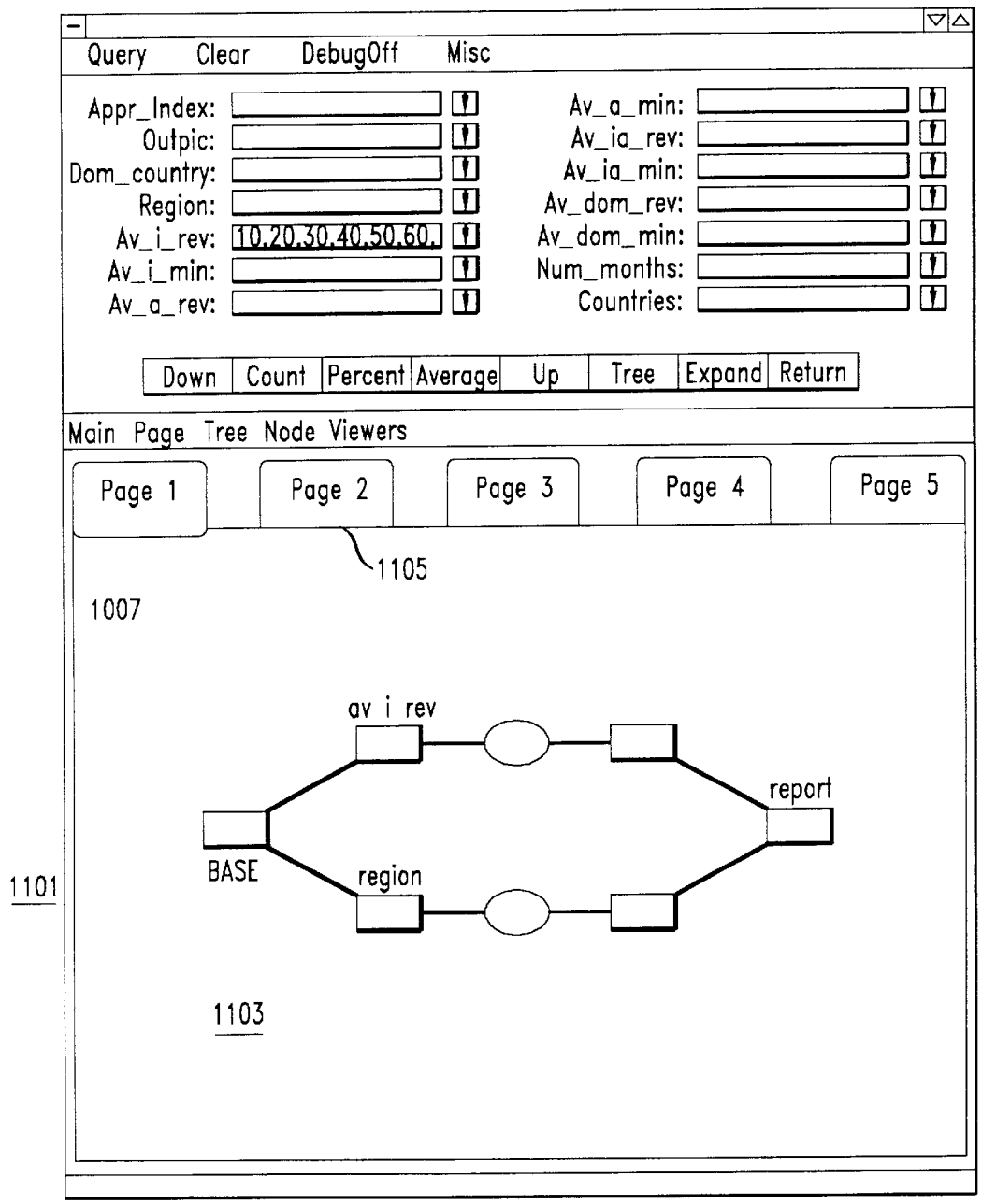
FIG. 11 is an eighth display window of the session.

FIGS. 10 and 11 show further features of the user interface. In FIG. 10, the business data analyst has made a copy 1005 of tree 1003. He or she has done so by using the mouse to highlight tree 1003 and then selecting "copy" from the Tree menu. Copy 1005 can be attached to a different point of graph 1007 or moved to a different page of the display. Such a different page is shown in window 1101 of FIG. 11. As indicated by enlarged tab 1105, tree 1103 shown in the display is on page 2 of the window.

Design of the Business Data Exploration and Analysis System

The following high-level description of the design requirements for the business data exploration and analysis system begins with the user requirements for the system and then discusses the data base operations necessary to satisfy these requirements.

User Requirements

Discussions with business data analysts resulted in a set of five general user requirements for a support environment. We discuss these in turn now, with the following assumption. While we will use a relational database, we assume that it is in the relational data base in the form of a single database table with a known schema (this may require that we join associated information from various structured text files). This single table consists of a set of records or tuples, each record consisting of a number of fields or attributes. Each attribute has a type and the value of the attribute must be of the type. The types are typically numeric types and string types, and the string types may include free text types wherein the value may be any string and enumerated types wherein the value must be one of a predetermined set of strings.

Querying: The process of querying is that of specifying conditions on one or more of the data attributes to extract "interesting" subsets of data. The result of querying is a subset of the table; that is, a subset of the original set of records.

Segmentation: To segment data is to divide the data into non-overlapping subsets based on the values of one or more attributes. Note that there are at least two kinds of segmentations: those based on attributes with a relatively small fixed set of possible values (for example, a State attribute restricted to state codes, i.e. {AL, . . . }). We call these natural segmentations, because there is a natural way to divide the data up. On the other hand, quantitative attributes (like average revenue, or a person's age) require the user to specify a set of segment boundaries and an optional set of segment names. For example, a user may wish to segment the data on the Age attribute by specifying the following segments: for Age below 1, baby; for Age below 5 and above 1, toddler; for Age below 10 and above 5, child; for age below 13 and above 10, preteen; and so on.

Even for a natural segmentation, one can group the natural segments into larger groups and treat these groups as segments. For example, one might group the States into: Eastern={MA, ME, NH, VT, RI, CN, . . . }, Western={CA, WA, OR, . . . }, etc. These groupings must have no duplicates and use all of the original natural segments for them to be a true segmentation themselves.

Summary Information: Querying and segmentation divide and group the data; the user must be able to compute and present various kinds of summary information (e.g., COUNT, AVERAGE) over various data attributes. These are the actual computations that will make up part of an analysis. These computations must be presented to the user in various graphical forms, e.g., bar charts.

Being able to easily extract "interesting" subsets of data, being able to naturally divide the data into non-overlapping subsets, and computing and presenting summary information are the operations performed repeatedly by the BDA.

External Tools: While querying, segmentation, and computing summary information are the most commonly performed operations, the BDA often requires access to the capabilities of specialized systems—for example, statistical packages, like S, and other common analytical systems, like Excel—to further analyze and display the data.

As exploration and analysis proceed together, and a set of interesting results is derived, these results must eventually be compiled into a report, including graphics, text, and tables. This requires the ability to import the results of analysis into a separate report writing tool.

History Mechanism: One of the critical problems illustrated in the scenario in the Description of the Prior Art is the difficulty of keeping track of the operations performed. A comprehensive history mechanism would maintain a record of all tasks performed by the analyst, infer semantic relationships between the various tasks, and make it convenient to reuse work.

A Database View of the User Requirements

This section examines each of the user requirements and develops an abstract database notation for examining each more closely. We also describe how these requirements are met in the system of the preferred embodiment.

Querying

Consider a database table R whose schema has attributes $A_1, \ldots, A_n$. Let $\mathcal{D}_i$ be the domain of attribute $A_i$, $1 \leq i \leq n$, i.e., the value of attribute $A_i$ in each record in table R is drawn from $\mathcal{D}_i$. For example, the BTN (billing telephone number) attribute in the BDA's data is drawn from the domain of ten digit positive integers (actually, with the additional ill-formed and also changing constraint of being a "legitimate telephone number"), and the total-minutes attribute is drawn from the non-negative integers.

The data exploration and analysis apparatus allows a user to query R by specifying independent conditions for each of the attributes of R. A condition for attribute $A_i$ of R, denoted by $C_i$, can be one of the following.

Finite Collection: $C_i$ can be a finite collection of values from $\mathcal{D}_i$; a single value is a special case. This is specified by explicitly enumerating the set of values from $\mathcal{D}_i$.

Range: $C_i$ can be a range of values from $\mathcal{D}_i$; specifying this requires that $\mathcal{D}_i$ be a totally ordered domain. A range is specified by its two end points, each of which is in $\mathcal{D}_i$.

Full Domain: $C_i$ can be the full domain $\mathcal{D}_i$; this is the default.

The result of a query with conditions $C_1, \ldots, C_n$ on attributes $A_1, \ldots, A_n$ is a table R', with the same schema as R. A record r of R is in R' if and only if the value of attribute $A_i$, $1 \leq i \leq n$, satisfies condition $C_i$.

Segmentation

Consider a database table R whose schema has attributes $A_1, \ldots, A_n$. First, we consider segmentation of table R on a single attribute $A_i$. Let $\mathcal{D}_i^1, \ldots, \mathcal{D}_i^{m_i}$ be a partition of the values in the domain $\mathcal{D}_i$ of attribute $A_i$.

Definition 0.1 (Segmentation) A segmentation of table R on attribute $A_i$ using the partition $\mathcal{D}_i^1, \ldots, \mathcal{D}_i^{m_i}$ of domain $\mathcal{D}_i$ is a collection of $m_i$, possibly empty, tables $R^1, \ldots, R^{m_i}$, such that:

The schema of each table $R^j$ includes all the attributes of R, and one additional segment description attribute, $D_s$.

For each record $\bar{t}$ in R, there exists exactly one $R^j$, $1 \leq j \leq m_i$ such that $d^j \cdot \bar{t}$ is a record in $R^j$, where $d^j$ is the segment description of table $R^j$, and "·" is the record concatenation operator.

The value of attribute $A_i$ in each record in the table $R^j$ is drawn from $\mathcal{D}_i^j$, $1 \leq j \leq m_i$.

The tables $R^1, \ldots, R^{m_i}$ are referred to as segments of table R. □

The data exploration and analysis system allows a user to segment a table R using attribute $A_i$ by specifying how the domain $\mathcal{D}_i$ should be partitioned. This can be specified in one of the following ways:

Simple Partition: A simple partition of domain $\mathcal{D}_i$ is a partition where each value in $\mathcal{D}_i$ is in a separate partition by itself; this is the default. When the table R is finite, the number of non-empty segments of a table is finite, even when the domain $\mathcal{D}_i$ is infinite.

Such a simple partition can be used, for example, to segment customer data on the basis of the State attribute: one partition for each state (e.g., MA, ME, AL).

Finite Collection Partition: A finite collection partition of domain $\mathcal{D}_i$ explicitly specifies the finite set of values in each partition of the domain; this can only be specified for finite domains.

Such a finite collection partition can be used, for example, to segment customer data on the State attribute by grouping states into regions, such as NorthEast={MA, ME, CN, RI, VE, NH}, etc. This assumes that there is no pre-computed attribute called Region.

Range Partition: For a totally ordered domain $\mathcal{D}_i$, a range partition chooses $m_i-1$ distinct elements $e^1 \leq \ldots \leq e^{m_i-1}$ from $\mathcal{D}_i$ and partitions $\mathcal{D}_i$ such that all elements in the partition $\mathcal{D}_i^j$, $1 \leq j \leq m_i-1$ are $<= e^j$, and $e^j$ is $<$ all elements in $\mathcal{D}_i^{j+1}$, $1 \leq j \leq m_i-1$.

Such a range partition of the domain can be used, for example, to segment customer data based on the Average-revenue attribute (say, by using the partition elements 10, 25, and 75). Typically, the BDA would associate a name with each segment, such as low-revenue-customers, medium-revenue-customers, etc.

Note that the user bounds the number of partitions when using finite collection partitions and range partitions, whereas the size of the domain and the size of the original table bounds the number of partitions when using simple partitions.

Segmentation of a table R using multiple attributes is a straightforward extension of segmentation using a single attribute. The number of segments created is the product of the number of partitions of each of the attribute domains. For example, the BDA might segment using both the above finite collection partition Region and the the above range partition on the Average_revenue partition. If there were 6 regions, this would result in 24 segments. Note that the BDA might again wish to name these segments, i.e., NE-low-revenue-customer, NE-medium-revenue-customer, etc.

Summary Information

Summary information, using aggregates such as COUNT and AVERAGE on an attribute of a table can be extremely useful in determining whether a given segmentation of a table R is suitable for subsequent analysis. The data exploration and analysis system of the preferred embodiment allows the user to perform the following operations.

Summary Computation: Summary information can be computed using any of the SQL aggregate functions on a given table or a given segmentation of a table. For the MIN, MAX, SUM and AVERAGE aggregate functions, the user has to specify the attribute of the table (or of the segmentation of the table) on which the aggregate function needs to be computed. For the COUNT aggregate function, no additional attribute need be specified.

The result of a summary computation on a table is a unary table with a single record containing the aggregate value. On a segmentation of a table, the result is a binary table with m records, one record for each table in the segmentation; the value of the first attribute in a record is the segment description of the corresponding segment of the table; the value of the second attribute in each record is the corresponding aggregate value.

Summary Presentation: The computed summary information can be presented in any of a variety of ways, e.g., histograms, bar charts, and pie charts.

External Tools

The data exploration and analysis capabilities described so far are not enough. There are a variety of other functions performed by the business data analyst using other kinds of tools. For example, in the brief scenario of the Description of the Prior Art, the statistical package S was used to graph some data extracted earlier; S is also used to compute other kinds of statistics. Other tools of this kind include tree induction systems, business graphics packages, modeling tools, and other common business software like Word and Excel.

Typically, the final output of an exploration and analysis session is a report, documenting in words and graphics the important findings, open questions, interesting relationships, etc. found in the session, using a report writing tool.

It seems silly to try to duplicate some or all of this kind of functionality; there are several other approaches. One of the easiest is to provide a facility to dump data to an external file, perhaps in several formats. Then the user can independently run another tool which can read the file and manipulate the data. A more sophisticated approach would involve making the process more seamless by using, for example, the OLE protocol for embedding applications.

The approach advocated by our system is more ambitious. Not only do we want to be able to export data into other tools but, if possible, we would like to be able to import the results of that processing into our system. Furthermore, we would like to capture what the processing steps were. Depending on how this was done, this would allow the system to re-run this processing. In the best of all worlds, the processing done by external tools could be captured in a meaningful representation and further manipulated by the system.

Translation to SQL

A query on table R with conditions $C_1, \ldots, C_n$ on attributes $A_1, \ldots, A_n$ is translated into the following SQL code, where full domain conditions are dropped from the WHERE clause:

SELECT *
FROM R
WHERE $C_1$ AND ... AND $C_n$

The implementation of a segmentation of table R using attribute $A_i$ depends on how the domain $\mathcal{D}_i$ is partitioned. For a simple partition of the domain, the following SQL code is generated, where all the segments are stored in a single view table. Recall that the additional segment description attribute is required by the definition of a segmentation.

CREATE VIEW R' AS
SELECT $A_i$, R.*
FROM R

For a finite collection partition of the domain $\mathcal{D}_i$ into $\mathcal{D}_i^1, \ldots, \mathcal{D}_i^{m_i}$, we first create an auxiliary binary table CSD(Id, Val),'such that for each value $e \in \mathcal{D}_i^j$, there is a record ($d^j$, e) in CSD, where $d^j$ is the identifier for $\mathcal{D}_i^j$. The following SQL code is then generated to compute the segments of R. Note that the identifier for $\mathcal{D}_i$ is used as the segment description for $R^j$.

CREATE VIEW R' AS
SELECT CSD.Id, R.*
FROM R, CSD
WHERE $R.A_i$=CSD.Val

For a range partition of the domain $\mathcal{D}_i$ into $\mathcal{D}_i^1, \ldots, \mathcal{D}_i^{m_i}$, we first create an auxiliary ternary table RS D(Id, Low, High), such that for each $\mathcal{D}_i^j$, $1 \leq j \leq m_i$, there is a record ($d^j$, $l^j$, $r^j$) in RS D, where $d^j$ is the identifier for $\mathcal{D}_i^j$, $l^j$ is the left end point of the range for $\mathcal{D}_i^j$ and $r^j$ is the right end point of the range for $\mathcal{D}_i^j$. The following SQL code is then generated to compute the segments of R.

CREATE VIEW R' AS
SELECT RS D.Id, R.*
FROM R, RS D
WHERE $R.A_i$<=RS D.High AND RS D.Low<$R.A_i$ The implementation of summary computation depends on whether it is computed on a table or on a segmentation of a table. Let AGG be the aggregate function that needs to be computed, on attribute $A_j$ of table R. For summary computation on a single table R, the following SQL code is generated.

CREATE VIEW $R_a$ AS
SELECT AGG($A_j$)
FROM R

For summary computation on a segmentation R' of a table, the following SQL code is generated, where $D_s$ is the segment description attribute of R'.

CREATE VIEW $R_a$ AS
SELECT $R'.D_s$, AGG($R'.A_j$)
FROM R'
GROUPBY $R'.D_s$

Details of the Implementation

The following discussion of the implementation of a preferred embodiment of the data exploration and analysis system will begin with a description of the implementation's architecture and will then provide detailed descriptions of the data structures and data bases employed in the implementation.

Figure 12:
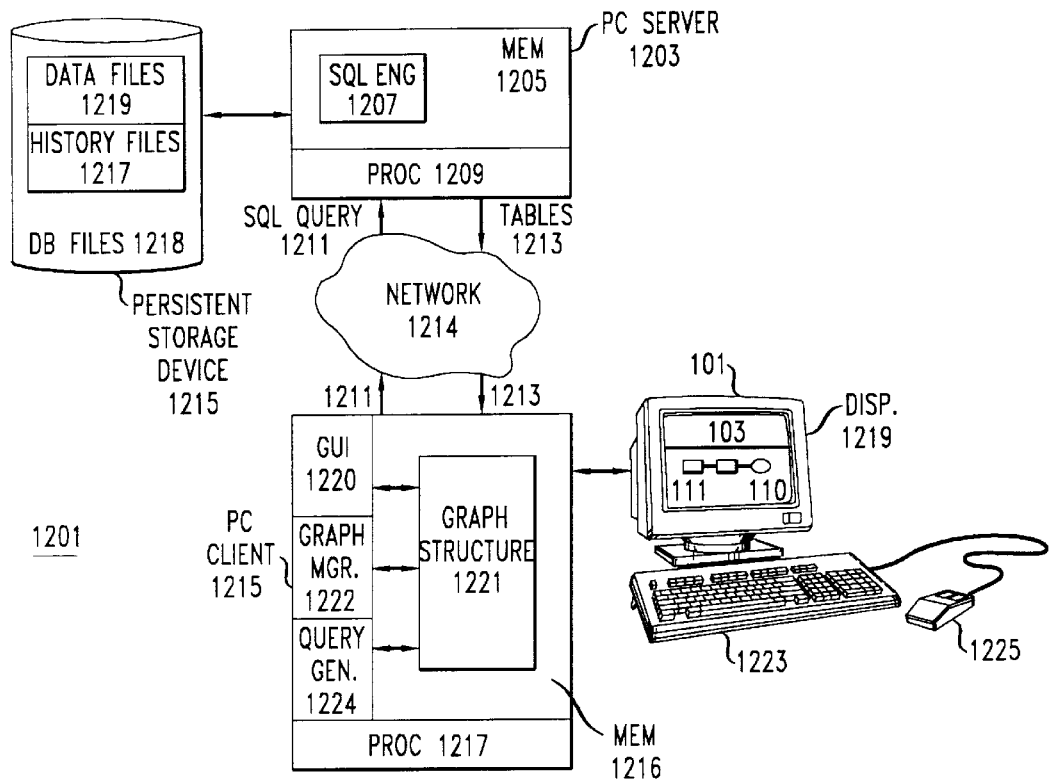
FIG. 12 is an overview of a preferred embodiment of the system.

Architecture of a Preferred Embodiment: FIG. 12

The architecture of a preferred embodiment of the data exploration and analysis system is shown in FIG. 12. Embodiment 1201 of the system is implemented using a client-server architecture. Both client and server are implemented using standard personal computers (PCs) connected by a network. PC server 1203 is connected to a persistent storage device 1215, for example, a disk drive. The data being analyzed (1219) and persistent data (1217) representing the graphs made by the preferred embodiment are stored in data base files 1218 in persistent storage device 1215. The data being analyzed and the persistent data are accessed by means of SQL queries received via network 1214 from PC client 1215. SQL query engine software 1207 responds to those queries by performing the queries on data base files 1218 and returning the resulting tables of data via network 1214, as indicated by arrows 1213.

PC client 1215 is connected to input-output devices including display 1219, keyboard 1223, and mouse or other pointing device 1225. When PC client 1215 is operating as a part of system 1201, it produces displays like those of FIG. 1. Shown is a variation of window 101. The business data analyst who is using PC client 1215 can perform the operations previously described for the displays by means of inputs from keyboard 1223 and mouse 1225.

Directed graph 111 of the display is represented in the memory 1216 of PC client 1215 by a graph structure 1221. Standard graphical user interface (GUI) software 1220 generates the display of directed graph 111 from graph structure 1221, and when the business data analyst performs an operation which changes graph 111, graphical user interface 1220 responds to the input from the business data analyst by invoking routines in graph manager code 1222 which alter graph structure 1221 as required for the operation. Graph manager code 1222 also uses query generator 1224 to initialize graph structure 1221 from history files 1217 in data base files 1218 and to store a representation of graph structure 1221 in history files 1217.

When the business data analyst specifies that a branch of graph 111 be executed, query generator 1224 reads graph structure 1221 to make an SQL query 1211 and then provides the query via network 1214 to PC server 1203, where SQL engine 1207 performs the query. The table 1213 returned by the query is stored in graph structure 1221 and is used as specified by the user in graph 111.

In the preferred embodiment, SQL engine 1207 is WAT-COM SQL 4.0, manufactured by WATCOM International Corporation, 415 Phillip St., Waterloo, Ontario. Graphical user interface 1220 is implemented using Tool-Book, produced by Asymetrix Corporation, 110 110th Ave. N.E., Suite 700, Bellevue, Wash. The connection between server 1203 and client 1215 over network 1214 employs the ODBC protocol on top of TCP/IP. Use of this protocol permits client 1215 to be used with a variety of data base servers 1203.

The above architecture is based on three key ideas:

1. All data, including: (a) the SQL code for querying, segmentation, and summary computation, (b) tables corresponding to the results of the various tasks performed by the BDA, and (c) the derivation and semantic relationships between the business data analyst's various tasks, are stored in database tables at the server. This enables a clear separation of tasks between the client, with which the user interacts, and the server, where the data resides. The alternative, say of maintaining SQL code and the history information at the client side, would require considerable duplication of effort.

2. Whenever possible, tasks performed by the business data analyst have a lazy evaluation. For example, querying a table R generates only the relative and absolute SQL code needed to compute the resulting table R'. Similarly, a summary computation generates only the required SQL code.

Only when the user explicitly requests that a table, a segmentation of a table or summary information be presented is any actual computation performed at the server. The alternative, of eagerly materializing each table and table segments, is extremely space inefficient, especially when the user mostly requests the presentation of summary information.

3. The SQL code that is evaluated is parameterized by the data to be analyzed, so that the same SQL code can be used on different data sets. This in turn permits complete reuse of the business data analyst's efforts.

For example, the business data analyst currently performs data exploration and analysis on a sample of the complete data; when satisfied, she repeats the entire sequence of analysis on the complete data set. Making the SQL code relative to the root table enables the data exploration and analysis system to automatically perform this second phase of the analysis.

Figure 13:
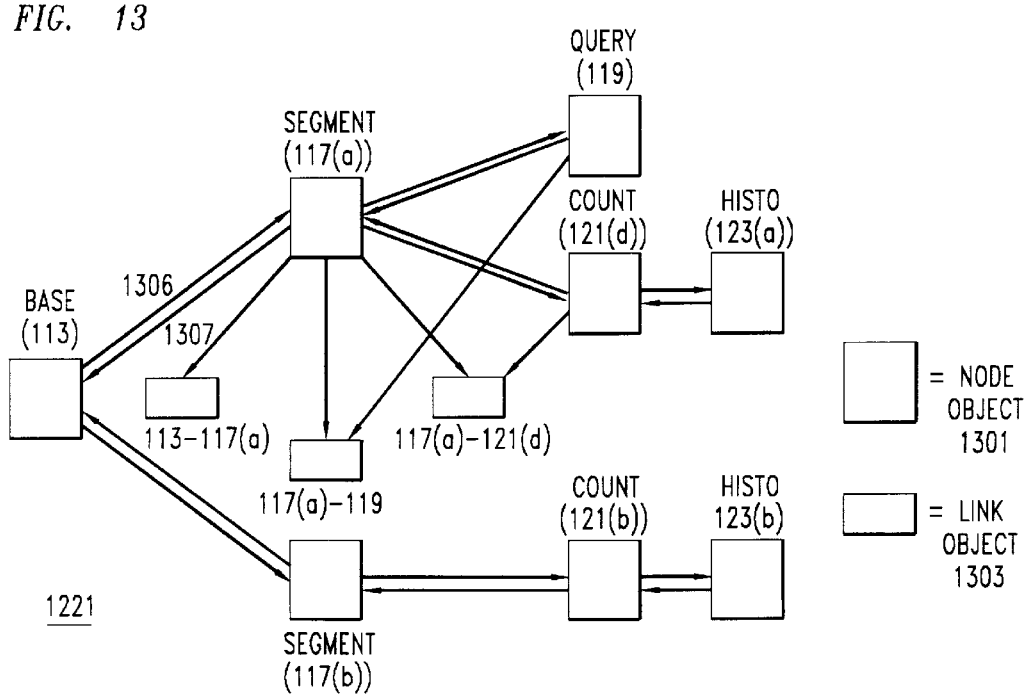
FIG. 13 is an overview of the data structure which represents a graph in the preferred embodiment.
Figure 14:
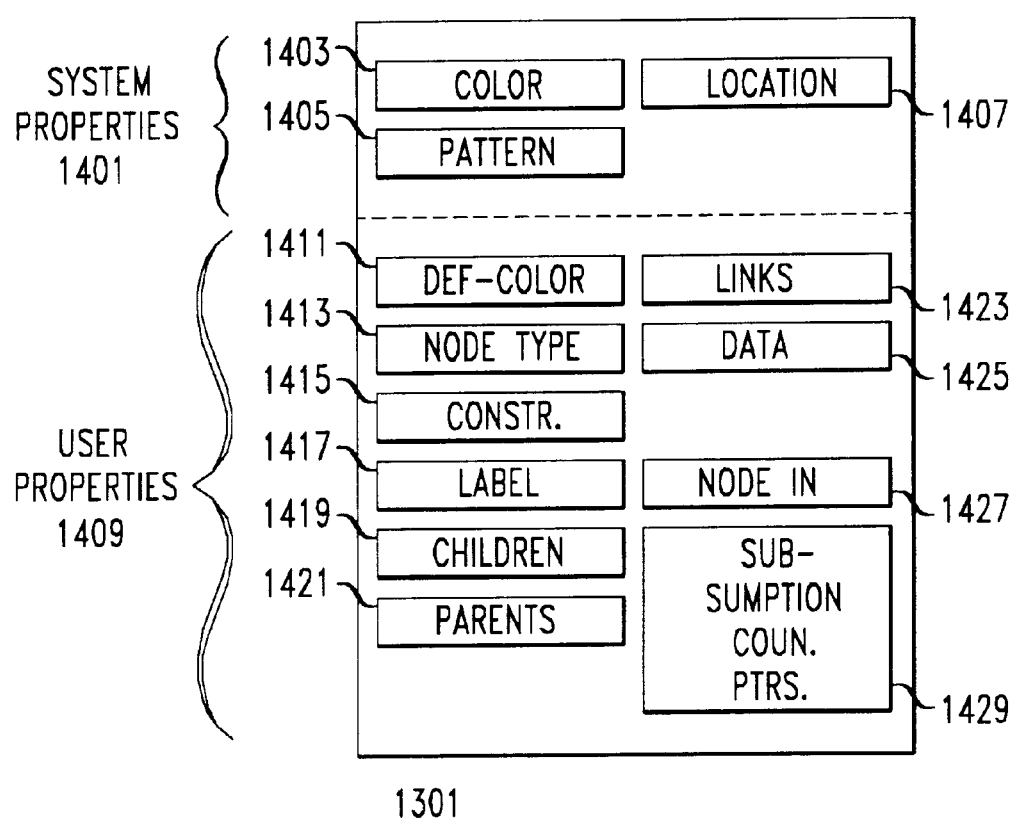
FIG. 14 is a detail of a node object.

Details of Graph Structure 1221: FIGS. 13 and 14

Graph structure 1221 represents the graph displayed in portion 110 of window 101 in the memory of PC client 1215. FIG. 13 shows graph structure 1221 for graph 111 shown in FIG. 1. Graph structure 1221 is made up of two kinds of objects: node objects 1301, which represent the nodes of the graph, and link objects 1303, which represent the links of the graph. Each node object in FIG. 13 is labeled with its type and with the reference number of the node in FIG. 1 that the node object corresponds to. Only three link objects are shown, namely those for the links connecting node 117(*a*) to the rest of graph 111, but it is to be understood that there is a similar link object for every other link in graph 111. The labels on the link nodes indicate the nodes which the link represented by the link node connect. Each object provides access to the information which graphical user interface 1220 requires to display the node or link it represents. Node objects 1301 also provide access to the information required to perform the operation represented by the node.

The arrows in FIG. 13 show how elements of graph structure 1221 may be located from other elements thereof. A given node object 1301 includes pointers 1305 to the node objects 1301 representing any child nodes of the node represented by the given node object 1301 and pointers 1307 to any node objects 1301 representing a node which is a parent of the given node object. A given node object 1301 also contains pointers to any link objects 1303 representing links which begin or terminate at the node represented by the given node object. These pointers are included so that when a subtree is moved, the links are moved with the subtree.

FIG. 14 gives a detailed view of the information which may be accessed via a node object 1301. Since node object 1301 is an object, internal details of how the information is represented are hidden and are of no interest to this discussion. The data structure which actually represents the node object may itself contain the information or may merely contain information by means of which the information may be located; what is important is that there are operations provided by the object for reading and writing the information.

The information in node object 1301 is divided into two classes of properties: system properties 1401, which are properties whose meaning and use is defined by graphical user interface 1220, and user properties 1409, which are properties whose meaning and use is defined by the user who defines the type of node object 1301. As shown in FIG. 14, the system properties include the color 1403 currently being used to display the node corresponding to node object 1301, the pattern 1405 currently being used, and the current location 1407 of the node in the display.

User properties 1409 include default color 1411, which is the color the node represented by node object 1301 is to have if it has not been selected as the current node, node type 1413, which specifies the type of the node represented by node object 1301, constraints 1415, which in the case of a query node or a segmentation node specifies the constraints for the query or the bounds of the segments, label 1417, which specifies the text label for the node, children 1419, which is a list of pointers 1305 to node objects representing children of the node represented by the present node object, parents 1421, which is a list of pointers 1307 to node objects representing parents, links 1423, which is a list of pointers 1309 to link objects for links to or from the node represented by the node object 1301, data 1425, which is the cached data resulting from performance of the operation represented by the node to which the node object corresponds, and node identifier 1427, which is an identifier that uniquely identifies the node. In a preferred embodiment, data 1425 is limited to vectors of the values returned by aggregation nodes; however in other embodiments, data 1425 might include the table returned by a query node or the segments returned by a segmentation node. Subsumption connection pointers 1429, finally, are used to define graphs which show subsumption relationships between nodes. These graphs will be discussed in more detail later.

How system 1201 operates will be immediately apparent from the foregoing disclosure of graph structure 1221. When the data analyst creates a new node in graph 111, he or she is using graph manager 1222 to make a new node object 1301. The type of the node is determined from the selections the analyst makes from portion 103 of the display, and in the case of segmentation or query nodes, constraints information 1415 is set from user inputs in the dialog boxes of portion 103 of the display. The children pointers and parents pointers 1421 are set as required by the current node, as are the pointers 1423 to the link nodes. When the user pushes the Down button in buttons 107, graphical user interface 1220 invokes graph manager 1222, which adds the node corresponding to new node object 1301 to graph 111, setting location information 1407 as it does so. When the user pushes the Up button, graph manager 1222 copies constraint information 1415 from node object 1301 corresponding to the current node in graph 111 to a new node object 1301.

Deletion, moving, and copying nodes or subtrees is done by using graph manager 1222 to deleteg, move, or copy the corresponding node objects or subtrees in graph structure 1221, with GUI 1220 responding to the changes by displaying the graph 111 corresponding to the modified graph structure 1221.

When the business data analyst selects a node of graph 111 for execution, query generator 1224 reads the node objects 1301 of graph structure 1221 from the node object 1301 corresponding to the selected node through the node objects corresponding to the nodes between the selected node and the base node and uses the node type information 1413 and the constraint information 1413 from the nodes to construct an SQL query which will perform the querying, segmentation, and aggregation operations specified by the nodes of graph 111. How one makes queries corresponding to these operations is explained in the section Translation to SQL supra.

PC client 1215 provides the query corresponding to the querying, segmentation, and aggregation operations via network 1214 to PC server 1203. There, SQL engine 1207 executes the query on the data file specified by the root of the tree and returns the result table 1213 to PC client 1215 via network 1213. If the sequence of operations selected by the business data analyst includes a viewer operation, the results are displayed in the form specified for the viewer operation. In the preferred embodiment, if the result table 1213 is a vector resulting from an aggregation operation, the vector is stored in the data information 1425 of the node object 1301 corresponding to the node in the graph which specified the aggregation operation. For example, in the graph structure 1221 shown in FIG. 13, the node object 1301 labeled COUNT (121 (*d*)) would contain a vector indicating the number of customers in each segment of the segmentation specified by the node object labeled SEGMENT (117(*a*)). If the business data analysis specified execution of that branch from histogram node 123(*a*), query generator 1224 would simply read graph structure 1221 from the node object labeled HISTO (123(*a*)) back to to the node object 1301 labeled COUNT (121(*d*)) and would use the vector in DATA 1425 of that node object to construct the histogram which it produces in response to the node object HISTO (123(*a*)).

The foregoing shows how a preferred embodiment implements lazy evaluation of graph 111. The evaluation is lazy because the operation represented by a node is not performed at the time the node is created. Instead, the information associated with the node is used to make a query which based on the information associated with all of the segmentation, query, and aggregation nodes in the portion of graph 111 being evaluated. The constraints for the query are thus more restrictive than the constraints specified in any of the nodes and the table 1213 returned by the query takes up far less space than the tables that would have been returned if the operation represented by the node had been performed when the node was created. As described above, the encachement of intermediate results makes lazy evaluation even more efficient, since in many cases, only a few nodes of the sequence need be evaluated.

History Mechanism

Given the large number of tasks performed by the Business Data Analyst during the course of a data exploration and analysis session, it is important to keep track of the various tasks performed and the connections between these tasks. One way in which the data exploration and analysis system does this is with graph 111 of FIG. 1. This graph shows the derivation history, which is a history of all of the actions performed by the business data analyst. As we have seen, the actions include querying and segmenting tables, computing and presenting summary information, and interacting with external tools. Note that the derivation history does not keep track of the temporal sequence of tasks performed, only the logical connections between the tasks.

Another way in which the data exploration and analysis system can keep track of the tasks and their connections is by providing graphs which show subsumption connections between nodes representing query and segmentation operations. One such node is a subsumption of another such node if the data set resulting from the operation represented by the second node second such node reveals more detail about the data set defined resulting from the operation represented by the first node.

For example, the business data analyst may have initially computed a segmentation of table R using a simple partition on the domain of attribute State. At some later point in the analysis, she may resegment R using two attributes: a simple partition on the domain of attribute State and a range partition on the domain of attribute Average-revenue. Although the second segmentation was not derived from the first segmentation, there is a logical connection between the two: the second segmentation results in a finer partitioning of the original table than the first segmentation. Knowing about such relationships lets the computation be more efficient, as well as eases the task of the data analyst in preventing unnecessary repeated work.

In a preferred embodiment of the data exploration and analysis system, the history mechanism maintains four such subsumption connections:

Query—query: If table R2 is a subset of table R1, the relationship from R1 to R2 is said to be a query—query subsumption relationship.

Segmentation—segmentation: If a segmentation 52 is a finer partition of the records in table R than segmentation S1, the relationship from S1 to S2 is said to be a segmentation—segmentation subsumption relationship.

Query-segmentation: If a segmentation S1 is made of a table R1 derived by a query from table R, the relationship from R1 to S1 is said to be a query-segmentation subsumption relationship.

Segmentation-query: If a segmentation SI is a partition with n segments of records in table R and a set of tables R2[0. . . n−1] is the tables resulting from a query which defines subsets of the segments, then the relationship from S1 to R2[0. . . n−1] is said to be a segmentation-query subsumption relationship.

Since a segmentation is always derived from a table, and summary information is always computed either on a table or on a segmentation, additional secondary subsumption relationships can be derived using the basic subsumption relationships described above.

Implementation of the History Mechanism

The manner in which the derivation history is maintained and displayed has already been explained; in a preferred embodiment, a graph representing the subsumption connections of the nodes in the derivation history is displayed by "overlaying" a graph of the selected subsumption connection on the graph of the derivation history. Nodes of the derivation history which are also nodes of the subsumption connection are displayed in a different color, and the edges connecting the nodes of the subsumption connection are also displayed in a different color from the edges connecting the nodes of the derivation history. Nodes of the subsumption graph which have been materialized are highlighted. A node is materialized when the table or other result produced by the operation represented by the node is available either as a materialized view in data files 1219 or encached within the node data structure corresponding to the node. Of course, the graph of the subsumption connection may also be displayed by itself. Which subsumption connection graph is to be displayed is selected by means of a button or menu in upper portion 103 of the display, for example by means of a submenu entry from the main menu in menu 107.

The only operation a user can perform on a subsumption graph is to request that a node be materialized. That is done by selecting the node with the mouse. The data exploration and analysis system then materializes the node in accordance with the sequence of operations specified in the derivation history graph for the node, that is, the system computes and stores a result which is equal to the result that would have been computed if all of the operations between the root of the derivation graph and the selected node had been executed. As indicated above, the result may be stored as a materialized view in data files 1219 or encached in the node object 1301 which represents the node. What operations will in fact be executed to materialize the node depends of course on what materialized results are already available.

In addition to making the subsumption connections of a derivation history graph visible to the business data analyst, the subsumption connection graphs further permit optimization of the execution of portions of the derivation history graph. The subsumption connection graphs do so by making it possible to use the result produced when a node has been materialized in another operation, instead of again doing the operation represented by the materialized node. For example, if the subsumption connection graph has a materialized query node to which another query node is subsumed, there will be a materialized view corresponding to the materialized query node in data files 1219 and the query represented by the other query node can be performed on the materialized view, regardless of whether the other query node is a child of the materialized query node in the derivation history graph.

The information needed to make the various kinds of subsumption graphs is contained in node object 1301. As shown in FIG. 14, node object 1301 for query and segmentation nodes contains subsumption connection pointers 1429, which are pointers that double link node objects 1301 belonging to the various subsumption connection graphs. When the user selects one of the subsumption connections, graphical user interface 1220 uses the pointers for the particular subsumption connection selected to locate the node objects 1301 required for the graph of the subsumption connection and uses the information in those node objects 1301 to draw the graph.

To determine the subsumption relations, the preferred embodiment uses the following algorithms:

Query—query: For tables R1 and R2, the pair (R1,R2) is in the query—query subsumption relationship table QQSR (Subsumer, Subsumed) if:
 1. both R1 and R2 are tables generated by querying, and
 2. the conditions in the WHERE clause of R2 are at least as strong as the conditions in the WHERE clause of R1.

Since all ancestors of a querying task are required to be querying tasks as well, both R1 and R2 will have only the root table in their FROM clauses; hence, no conditions on the FROM clauses of R1 and R2 are required.

Segmentation—segmentation: For table segmentations R1' and R2', the pair (R1', R2') is in the segmentation—segmentation subsumption relationship table SSSR (Subsumer, Subsumed) if:
 1. the parent tables R1 of R1', and R2 of R2' are such that either R1=R2, or (R1, R2) and (R2, R1) are both in the table QQSR, i.e., the parent tables have identical extensions, and
 2. the attributes along which R2 is segmented includes all the attributes along which R1 is segmented, and
 3. along each attribute $A_i$ that R1 is segmented, the partitioning of the domain $\mathcal{D}_i$ in R1' is identical to or is refined by the partitioning of the domain $\mathcal{D}_i$ in R2'.

Similar algorithms may be employed for the other two subsumption connections.

Persistent Representations of the Graphs

In the preferred embodiment, persistent representations of the graphs produced in window 101 are stored in history files 1217 of data base files 1218. Graph manager 1222 makes the persistent representations in response to a save command by the business data analyst or automatically at the end of a session. Once a graph has been saved in a persistent representation, the business data analyst may then select one of the saved graphs for display in the same manner as one selects a file for editing. When the business data analyst has done so, graph manager 1222 uses the persistent representations to construct node objects 1301 for the graph.

The graph of the derivation history is maintained in three data base tables. In the following descriptions of these tables, Id comes from Node ID 1427 of a node object and Type comes from node type 1413 of the node object A binary table Deriv_nodes(Id, Type) that maintains node information about the type of each task performed by the BDA.

A ternary edge table Deriv_edges(Parent_Id, Child_Id, Relative_code) that maintains the derivation relationships, where Relatizve_code is the code to perform the task corresponding to Child_Id, given the table corresponding to Parent_Id; when Child_Id is a task that produces a table (e.g., querying, segmentation)

this is SQL code; when Child_Id is a task that produces a presentation, this is the presentation code.

A binary table Absolute_code(Id, Code) for tasks that produce tables, that maintains SQL code for generating the task corresponding to Id from the root table of the data exploration and analysis session. This is equivalent to the view definition obtained by merging the various view definitions for table producing tasks along the path from the root table in the derivation history.

There is a record in each of the three tables for each node in the derivation history graph. The records added to Deriv_ nodes and Deriv_edges are straightforwardly obtained by traversing the derivation history graph in the manner described above with regard to performing operations specified by the graph. The record in the table Absolute_code is obtained by merging the absolute SQL code of the parent of the current task into the view definition corresponding to the relative code of the current task.

The database tables for the subsumption connections consist of pairs of node IDs, one with the node ID of the subsuming node and the other with the node ID of the subsumed node.

Conclusion

The foregoing Detailed Description has shown those skilled in the arts to which the data exploration and analysis system pertains how to make and use such a system. The Detailed Description has further shown the best mode presently known to the inventors for making such a system. It will however be immediately apparent to those skilled in the art that the graphical techniques disclosed herein can be used for querying generally. Additionally, many further features could usefully be incorporated into the preferred embodiment. Among these are the following:

Caching, materialized views, and timestamps

If the data is timestamped, then the system will know when the cached data is out of date, and indicate that to the user.

If the database includes the ability to materialize views, then these views can be used to speed up computation by determining if a materialized view contains some or all the data needed for the computation.

Other possible node types

We have designed a number of other kinds of nodes that are not in the current implementation. These include:

a "join" node that uses an attribute to join two database tables to create a third a "multiple input histogram" that would take as input several nodes that create vectors. The output is a graph of several data sets. Note that the data sets would have to be compatible.

a "show table" node that would show you part of the actual table other visualizations—there are a variety of other possible data visualizations that could be appropriate "external tool" nodes—these would pipe the data into an external tool like Excel or S; the data might have to be transformed or re-formatted in some way an "and" node for combining query nodes. The inputs would have to be compatible segmentation nodes on more than one attribute Our Report node is very crude. A more advanced Report node could be implemented as an an external tool like Microsoft Word (A registered trademark of Microsoft Corporation) and the system of the invention would properly format the data for the tool and then export the data to the tool. Also possible are more intelligent nodes that perform some kinds of analysis, like comparing two graphs for "interesting" differences.

"Smart Text"

The currently implemented Text Node has a piece of text associated with it. We have designed and implemented (but not integrated with the current prototype) a grammar for generating text from data. This text could appear in an automatically produced report. For example, if the input to the text node was a Count of a Segmentation by State, a "Smart Text" node could use information in the entire branch to produce text like this:

"For income over the entire United States, the State with the highest average income was Connecticut, with $17,265 dollars. This is 65% higher than the average income for the lowest state, Mississippi, whose average income is $8,192." This text could be exported to a report or used as a graph caption.

There are further a multitude of ways of implementing systems which embody the principles of the system of the invention. For example, the components of the system of the invention may be distributed among one or more machines in a fashion which differs from the client-server architecture disclosed herein and the machines might not be PCs. The graphs might look different from the graphs displayed by the preferred embodiment and might include nodes for different operations. Further, there might be a different user interface for adding nodes to the graph, specifying execution of a portion of the graph, or displaying a different kind of history graph.

Different data structures may be used for the non-persistent and persistent representations, and some embodiments may only have the persistent representations or only the non-persistent representations. The persistent representations, finally, may be stored in data base systems other than SQL or even stored as flat files. Similarly, there are many implementations of lazy evaluation and encaching. Other embodiments may be constructed which either encache or do lazy evaluation, but do not do both, and still others may do neither.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A business data exploration and analysis apparatus for discovering useful patterns in database information and for interactively specifying one or more operations on business data stored as database information, the apparatus being employed in a system which has a display, an input device, and access to the business data and the apparatus comprising:

a first acyclical directed graph of one or more nodes and edges in the display, a node in the first acyclical directed graph representing a business data operation and an edge ending in a node in the first acyclical directed graph indicating that the node from which the edge comes is a source of business data for the operation performed by the node at which the edge ends, the first acyclical directed graph providing a derivational history of the operation or operations on the business data, at least one operation comprising a query, segmentation, aggregation or a viewer operation to determine useful patterns in the business data by determining relationships in the business data, and first means responsive to the input device for executing operations specified in nodes of the first graph on the business data specified by the edges thereof.

2. The apparatus set forth in claim 1 wherein:

the first graph further includes a root node representing a source of the data.

3. The apparatus set forth in claim 2 wherein:

the input device selects a node of the first graph and the first means responsive to the input device executes the operations in the nodes between the selected node and the root node, the operations being executed on the data specified by the edges beginning at the root node.

4. The apparatus set forth in claim 2 wherein:

the operations specified by the first graph are parameterized by the properties of the source of data represented by the root node, whereby the operations may be performed on any other source of data which has those properties.

5. The apparatus set forth in claim 1 further comprising:

second means responsive to the input device for adding a node to the first graph.

6. The apparatus set forth in claim 5 wherein:

the second means further specifies a constraint associated with the operation represented by the added node.

7. The apparatus set forth in claim 5 wherein:

the second means does not cause the operation specified by the added node to be performed.

8. The apparatus set forth in claim 1 further comprising:

means for associating result data produced by the operation represented by a node with the node; and the first means responsive to the input device uses any result data associated with a node when the first means executes the operations.

9. The apparatus set forth in claim 8 further comprising:

a data structure representing a second acyclic directed graph of one or more of the nodes and additional edges in the display, the additional edges indicating subsumption relationships between the results of the operations represented by the nodes connected by the additional edges, the first means responsive to the input device using the data structure to locate a subsuming node having result data associated therewith and using the result data to execute an operation specifed by a subsumed node.

10. The apparatus set forth in any one of claims 1 through 8 wherein:

the data is stored in a data base; and the operations on the data represented by the nodes include a data base operation which performs a data base operation on the data.

11. The apparatus set forth in claim 10 wherein:

the data base operation is a query operation which employs constraints to produce a subset of the data produced by an operation represented by a node from which an edge leads to the node representing the query operation.

12. The apparatus set forth in claim 10 wherein:

the data base operation is a segmentation operation which divides the data produced by an operation represented by a node from which an edge leads to the node representing the segmentation into non-overlapping groups according to values of an attribute of the data.

13. The apparatus set forth in claim 10 wherein:

the data base operation is an aggregation operation which provides summary information about data produced by an operation represented by a node from which an edge leads to the node representing the aggregation operation.

14. The apparatus set forth in claim 13 wherein:

the aggregation operation is in the alternative a count operation, a sum operation, or an average operation.

15. The apparatus set forth in claim 10 wherein:

the system includes a data base server upon which the data base is stored and a client which includes the display and the input device; and the client performs the data base operation by sending a message to the server which specifies the data base operation, the server responding thereto by performing the data base operation and returning a message containing a result thereof to the client.

16. The apparatus set forth in claim 10 wherein the apparatus further comprises:

means for providing information about the first graph to the data base for storage therein; and means for producing the first graph by retrieving the stored information about the first graph from the data base.

17. The apparatus set forth in any one of claims 1 through 8 wherein:

the operations on the data represented by the nodes include a viewer operation which displays a result of an operation represented by a node from which an edge leads to the node representing the viewer operation.

18. The apparatus set forth in any one of claims 1 through 8 wherein:

the operations on the data represented by the nodes includes an external tool operation which applies a tool accessible to the system to a result of an operation represented by a node from which an edge leads to the node representing the external tool operation.

19. The apparatus set forth in any one of claims 1 through 8 wherein the system further includes persistent storage means and the apparatus further comprises:

means for storing a representation of the first graph in the persistent storage means and means for using the stored representation to produce the first graph.

20. The apparatus set forth in claims 1 through 8 comprising:

a second acyclic directed graph of one or more of the nodes and additional edges in the display, the additional edges indicating subsumption relationships between the results of the operations represented by the nodes connected by the edges.

21. The apparatus of any one of claims 1 through 8, further comprising memory storing code and a processor for executing the code to implement the system.

22. A business data exploration and analysis apparatus for discovering useful patterns in data base information and for interactively specifying one or more operations to determine useful patterns in the business data by determining relationships in the business data, each operation having source data and result data and the apparatus being employed in a system which has a display, an input device for specifying the operations, and access to the data, the apparatus further comprising a first acyclical directed graph of one or more nodes and edges in the display for representing in the display a plurality of different relationships between the result data produced by a first operation and the result data produced by a second operation a node in the first acyclical directed graph representing a business data operation and an edge ending in a node in the first acyclical directed graph indicating that the node from which the edge comes is a source of business data for the operation performed by the node at which the edge ends, the first acyclical directed graph providing a derivational history of the operation or operations on the business data at least one operation comprising a query, segmentation, aggregation or a viewer operation to determine useful patterns in the business data by determining relationships in the business data.

23. The apparatus of claim 22 wherein:
the plurality of different relationships include a derivation relationship wherein the result data produced by the first operation is the source data for the second operation.

24. The apparatus of claim 23 wherein:
the plurality of different relationships include a subsumption relationship wherein the result data produced by the second operation is subsumed in the result data produced by the first operation.

25. The apparatus of claim 24 wherein:
the subsumption relationship is a query—query relationship wherein the result data produced by the first and second operations are sets of data and the set of data produced by the second operation may be described by means of a constraint on the set of data produced by the first operation.

26. The apparatus of claim 24 wherein:
the subsumption relationship is a segmentation—segmentation relationship wherein the result data produced by the first and second operations are segmentations of a set of data and the segmentation produced by the second operation may be described as a further segmentation of the segmentation produced by the first operation.

27. The apparatus of claim 24 wherein:
the subsumption relationship is a query-segmentation relationship wherein the result data produced by the first operation is a set of data describable by means of a constraint on another set of data and the result data produced by the second operation is describable as a segmentation of the result data produced by the first operation.

28. The apparatus of claim 24 wherein:
the subsumption relationship is a segmentation-query relationship wherein the result data produced by the first operation is a segmentation of another set of data and the query produces a set of data for each segment of the segmentation which is describable by means of a constraint on the segment.

29. The apparatus set forth in any one of claims 22 through 28 wherein:
there is a plurality of the first and second operations and at least one of the representations is a directed graph wherein the first and second operations are represented by nodes in the graph and the relationships are represented by edges connecting the nodes.

30. The apparatus set forth in claim 29 wherein
a plurality of the representations are represented by the directed graphs; and
the apparatus further comprises:
means responsive to the input device for selecting a directed graph for display.

31. The apparatus set forth in claim 30 wherein:
one of the directed graphs is displayed as an overlay of another of the directed graphs.

32. The apparatus of any one of the claims 22 through 28 further comprising a memory which stores code and a processor for executing the code to implement the system.

* * * * *